H. H. SOUTHWORTH.
REFRIGERATING APPARATUS.
APPLICATION FILED MAY 8, 1914.

1,162,316.

Patented Nov. 30, 1915.
8 SHEETS—SHEET 2.

H. H. SOUTHWORTH.
REFRIGERATING APPARATUS.
APPLICATION FILED MAY 8, 1914.

1,162,316.

Patented Nov. 30, 1915.
8 SHEETS—SHEET 4.

H. H. SOUTHWORTH.
REFRIGERATING APPARATUS.
APPLICATION FILED MAY 8, 1914.

1,162,316.

Patented Nov. 30, 1915
8 SHEETS—SHEET 5.

Witnesses:
J. Frederic Cherry
Justin W. Macklin

Inventor
Harrison H. Southworth
by Albert H. Baker, Atty

H. H. SOUTHWORTH.
REFRIGERATING APPARATUS.
APPLICATION FILED MAY 8, 1914.

1,162,316.

Patented Nov. 30, 1915.
8 SHEETS—SHEET 7.

Witnesses:
J. Frederic Cherry
Justin W. Macklin

Inventor
Harrison H. Southworth
By Albert H. Bates, Atty

H. H. SOUTHWORTH.
REFRIGERATING APPARATUS.
APPLICATION FILED MAY 8, 1914.

1,162,316.

Patented Nov. 30, 1915.
8 SHEETS—SHEET 8.

UNITED STATES PATENT OFFICE.

HARRISON H. SOUTHWORTH, OF CLEVELAND, OHIO, ASSIGNOR, BY MESNE ASSIGNMENTS, TO THE ICELESS MACHINE COMPANY, OF CLEVELAND, OHIO, A CORPORATION OF OHIO.

REFRIGERATING APPARATUS.

1,162,316. Specification of Letters Patent. Patented Nov. 30, 1915.

Application filed May 8, 1914. Serial No. 837,118.

*To all whom it may concern:*

Be it known that I, HARRISON H. SOUTHWORTH, a citizen of the United States, residing at Cleveland, in the county of Cuyahoga, and State of Ohio, have invented a certain new and useful Improvement in Refrigerating Apparatus, of which the following is a full, clear, and exact description, reference being had to the accompanying drawings.

This invention relates to improvements in refrigerating apparatus, and particularly to the means for controlling the cooling and heating media in an absorption refrigerating apparatus in which is employed a single generator-absorber.

In my refrigerating apparatus practically all of the ammonia in the system (except the small amount left in the weak liquor in the generator-absorber) is driven from the generator-absorber to the condenser during the period of generation and practically all of said ammonia passes from the condenser through the refrigerating coils to the generator-absorber during the period of absorption.

An object of the invention is to provide an efficient and economical system of such a nature.

A more specific object is to provide a simple mechanism for automatically controlling the cooling and heating media which shall depend for its operation upon the conditions existing in the generator-absorber and in the condenser.

Another object is to so arrange the apparatus that there shall be no surplus of ammonia in the refrigerating coils and passages leading to and from the same when the generator-absorber has reached the end of its period of absorption.

Other objects will become apparent in the following specification and the essential characteristics are hereinafter set forth in the claims.

Referring now to the embodiment of my invention illustrated in the accompanying drawings, 20 indicates an open tank which constitutes a supporting base for the apparatus and which is adapted to contain cooling water. The tank 20 is oblong in plan and has a bottom wall 21, upright end walls 22, 22, and upright front and rear walls 23, 23.

25 indicates a drum or still (see Fig. 2) which may be of any suitable construction adapting it to act as a generator-absorber in a refrigerating apparatus of the absorption type. The said drum or still extends parallel with the length of the tank 20 and is supported above the same by means of bracket-plates 26, 26, which have laterally spaced depending legs 26$^a$, 26$^a$, (see Fig. 4) that rest upon and are attached to horizontal supporting bars 27, 27. Said supporting bars extend transversely of the tank 20 and are fixed to the front and rear walls 23, 23, thereof in any suitable manner. The bracket plates 26, 26 have horizontal extensions 26$^b$, 26$^b$, which support an oblong tank 28 located back of and extending parallel to the drum 25 and adapted to contain cooling water for a purpose presently to be described. Said tank is preferably provided with a cover 29, (see Fig. 5).

30 indicates a drum of a construction similar to that of the drum 25 located within the tank 28. Said drum is the ammonia condenser and receiver and will hereinafter be briefly referred to as the condenser. Said drum is set in an inclined position relative to the horizontal bottom wall of the tank 28, the discharge end of said drum (the right hand end as shown in dotted lines in Fig. 2), being lower than its inlet end, (namely, the left hand end as shown in said Fig. 2).

31, 31, indicate pipes rising from longitudinally spaced points in the top of the drum or still 25 and connected by means of a T-fitting 31$^a$ to a pipe 32 which discharges, through check-valves presently to be mentioned, into the inlet end of the condenser. Said pipes conduct the ammonia gas from the still to the condenser during the process of generation. The pipes 31, 31, pass through the adjacent front wall of the water tank 28 by means of water-tight fittings and are then inclined upwardly toward their connection with the pipe 32 leading to the condenser. Said pipes 31, 31, are covered during the period of generation by the water in the tank 28, as will presently appear, so that they act as rectifiers to condense the water vapor carried off with the ammonia gas driven from the still 25, and the water condensed therein flows by gravity back into the still.

A pipe 110 leads from the discharge end of the condenser 30 through a back pressure expansion valve 111 to the expansion coils 112 in the brine tank 113. The pipe 110 may be provided within the tank 28, with a manually operated valve 110$^a$, which may be closed for convenience in assembling and repairing.

33 indicates a return pipe leading from the expansion coils and acting to conduct the vaporized, expanded ammonia gas, after it has done its work in said coils, back to the generator-absorber drum 25 when it is acting as an absorber.

34 and 35 indicate spaced check-valves interposed in said return pipe 33 near its connection with the drum 25, to prevent a reverse flow from the generator-absorber 25 to the expansion coils during the process of generation. Similar spaced check valves 36 and 37 are interposed in the discharge pipe 32 to prevent a reverse flow from the condenser 30 through said pipe during the period when the generator-absorber 25 is acting as an absorber.

Figure 4:
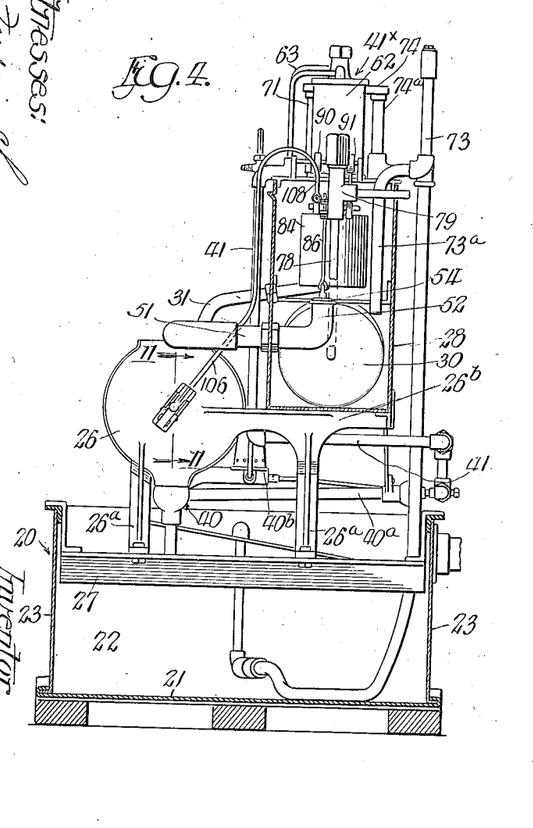
Fig. 4 is a view of the same partly in end elevation and partly in vertical section, said view being taken in a plane indicated by the line 4—4 of Fig. 2.
Figure 5:
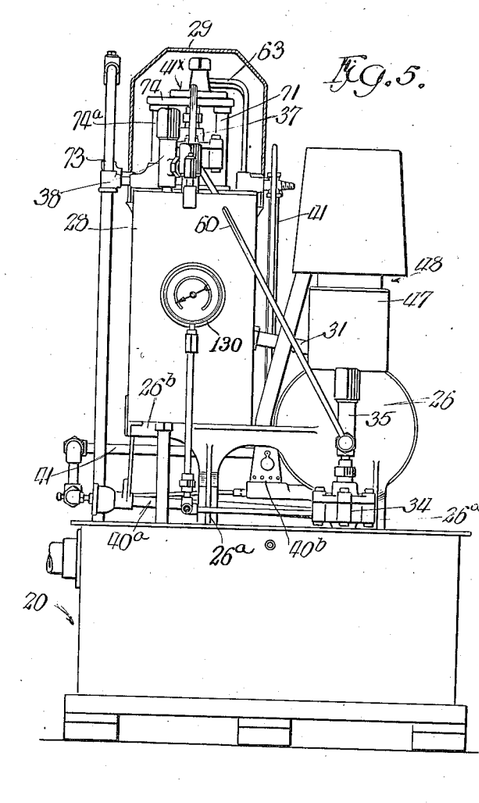
Fig. 5 is a view of the same in end elevation, as looked at from the left hand end of Fig. 2.
Figure 6:
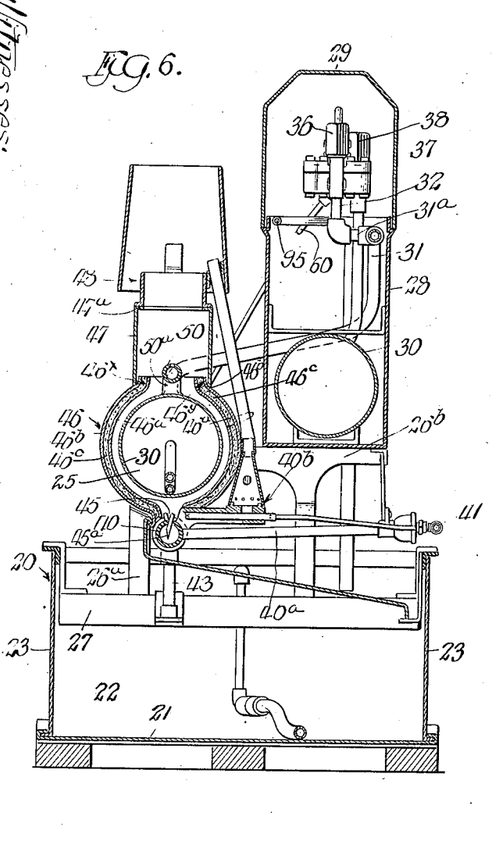
Fig. 6 is a vertical sectional view of my apparatus the plane of the section being indicated by the line 6—6 of Fig. 2.
Figure 12:
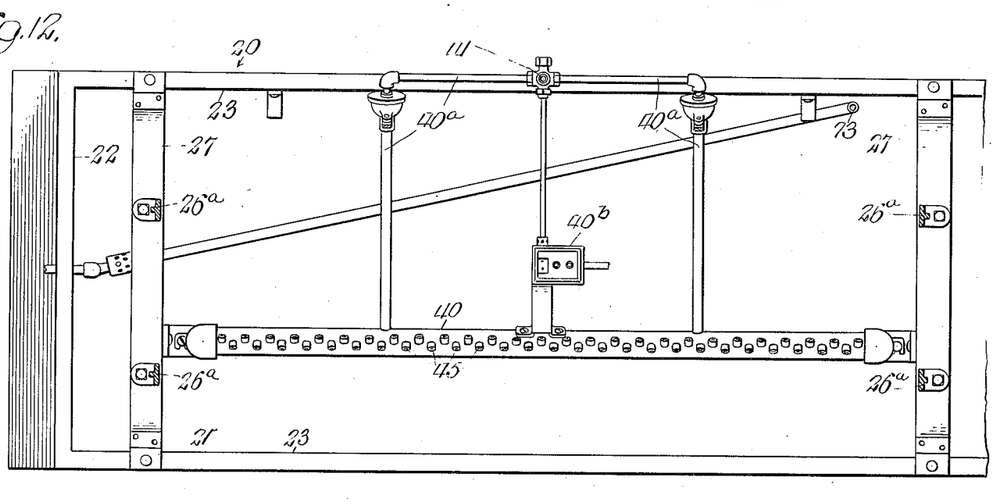
Fig. 12 is a plan sectional view of burner and tank of my improved apparatus, the plane of the section being indicated by line 12—12 of Fig. 2.
Figure 13:
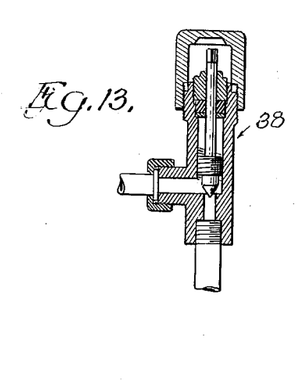
Fig. 13 is a vertical central sectional view of a manually operated shut-off valve interposed in a line leading to the condenser.

The heating means provided as shown herein, for heating the still during the cycle of generation is preferably a fuel gas burner. 40 indicates a burner-pipe located beneath the drum 25 in the vertical plane of its longitudinal central axis and connected by means of branch pipes 40$^a$ 40$^a$ (see Fig. 12) and a feed pipe 41 with a fuel gas controlling valve 41$^x$ (see Figs. 4 and 5). The said burner-pipe 40 is supported at its ends by means of upright pipes 43, 43, threaded into reducing elbow-fittings 43$^a$, 43$^a$, which close its ends. The lower, open ends of the pipes 43, 43, are supported, as shown, by plates attached to the transverse bars 27, 27, fixed in the tank 20 and are sealed by the water in said tank. The burner pipe 40 is provided with a plurality of discharge nipples consisting of short tubes 45 fixed in suitable holes formed in the top of the burner pipe and placed so that the alternate tubes discharge at either side of a vertical plane so as to distribute the flame over a large surface of the drum 25. The ends 45$^a$ of the tubes within the pipe 40 are beveled so that any water caught in said tubes will not be retained by capillary attraction but will fall from the tubes into the pipe 40 whence it will be discharged through the pipes 43 into the tank 20. 40$^b$ indicates a pilot light (see Fig. 12) adapted for lighting the burner pipe 40 when fuel gas is supplied thereto.

To guard against the loss of heat to the generator-absorber drum 25 during the period of generation, a shield 46 is preferably used. The said shield 46 is spaced a short distance from the walls of the drum and is parallel to the outer surface of said drum. The shield 46 is made in two sections 46$^x$, 46$^y$, each comprising inner and outer arcuate sheet metal members 46$^a$, 46$^b$, between which is interposed a sheet or layer of non-heat conducting material 46$^c$. The members 46$^a$, 46$^b$ are attached at their ends in any convenient manner to the bracket plates 26. The shield sections 46$^x$, 46$^y$ are spaced apart at their upper and lower edges to allow for a circulation of both the heating and cooling means about the drum 25. A cover 47 of a width adapted to inclose the opening between the top portions of said shield sections 46$^x$, 46$^y$, is provided and rests with its lower lateral edges upon said sections. Said cover has a top wall 47$^a$ having a centrally disposed stack 48 for carrying off the products of combustion.

The apparatus illustrated is cooled by means of water supplied as follows: 50 indicates a pipe perforated on the top and located above the generator-absorber drum 25 and within the cover 47 of the shield 46. Said pipe acts to convey cooling water to the generator-absorber during its period of absorption. The said pipe is supported at one end by a bracket 50$^a$ fixed to the top of the generator-absorber 25 and rests at its opposite end in a notch formed in one of the bracket plates 26. The pipe 50 is connected by means of a pipe 51 with the water tank 28, said pipe 51 within the tank has an upturned end 52 (see Figs. 2, 4 and 8) provided with a valve-seat for a valve plug 54. Automatic devices for discharging the water from the tank 28 into the pipe 50 during the absorption period of the generator-absorber drum 25 are hereinafter described.

In a pipe line 32 leading from the generator-absorber 25 to the condenser 30, as has been noted above, are placed check-valves 36 and 37.

38 indicates a shut-off valve adapted to be manually closed when desired, and which may be of any suitable construction. The two check-valves 37 and 36 and the two check-valves 34 and 35 in the return line are similar so that a description of one set of said valves will suffice for both.

Figure 7:
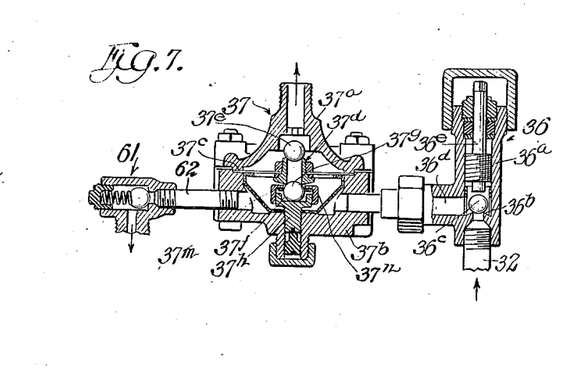
Fig. 7 is a detail sectional view on an enlarged scale of check valves in the ammonia gas line leading from the still to the condenser, the plane of the section being indicated by the line 7—7 of Fig. 3.

The check-valve 37 comprises upper and lower chambered members 37$^a$, 37$^b$, attached at their margins by means so as to provide a gas tight joint. 37$^c$ indicates a diaphragm of thin sheet metal, the marginal parts of which are clamped between the flanges of said chambered members 37$^a$, 37$^b$. The diaphragm 37$^c$ has a central opening in which is secured an apertured valve plug 37$^d$ secured to the diaphragm in a suitable manner. The upper and lower ends of said valve plug are formed to provide valve seats for ball-valves 37$^e$, 37$^g$.

The lower ball-valve 37$^g$ is located in a recess 37$^f$, in the upper end of a plug 37$^h$ having a threaded stem engaged in a threaded aperture formed in the lower chambered member 37$^b$. Said ball is retained in its recess by means of a floating plate 37$^m$ in such manner as to be capable of limited rolling movement in a direction transverse of its seat. Said plate is held in position by means of a flanged nut 37$^n$ applied to the upper end of the plug 37$^h$.

The plug 37$^h$ is adjustable vertically to vary the position of the lower ball valve 37$^g$ with reference to its seat on the valve plug 37$^d$.

It is apparent from the above description that the fluid may pass freely from the lower chambered member to the upper chambered member when the pressure is greater in the first than in the second, since the excess pressure will raise the ball 37$^e$ and pass to and through the upper chambered member. The normal position of the diaphragm is such that the valve plug 37$^d$ is slightly above the lower ball 37$^g$, so that when the fluid is passing in the normal direction, it only has to raise one ball to pass the check valve. When, however, a differential pressure is exerted in a reverse direction, the diaphragm is depressed and both balls are maintained seated, thus preventing a return flow through the check valve. The valve is substantially as described in an application filed October 10, 1912, by George A. Gase, Serial No. 724,915.

The ball check valve 36, as shown in the drawings, consists of an upright tubular casing 36$^a$, provided near its lower end with a ported valve seat 36$^b$, upon which rests a ball valve 36$^c$.

36$^d$ indicates a passage above the valve seat through which the fluid passes toward the check valve 37 after it has lifted and passed the ball valve 36$^c$. The casing contains a stem or rod 36$^e$ above the ball valve, adapted to be screwed down upon the ball to positively close it upon its seat when desired, said stem extending through a suitable stuffing box at the top of the casing and being inclosed by a cap as indicated, in a familiar manner.

60 (see Fig. 2) indicates a by-pass connecting the discharge line 32 with the return line 33. As shown, said by-pass connects the lower chambered member 37$^b$ of the check-valve 37 in the discharge line 32 with the lower end of the ball check-valve casing 35 in the return line 33. A spring controlled ball check-valve 61 is interposed in said by-pass adjacent its connection with the check-valve 37 as shown in Fig. 7. Said check-valve is of any familiar construction, as illustrated in the drawings. This by-pass acts to conduct any ammonia gas which may leak through the check-valve 37 in the discharge line, during the time the generator-absorber is absorbing, into the return line, so that it will be taken into the generator-absorber into the water absorbent with the vaporized expanded ammonia coming from the expansion coils.

Figure 16:
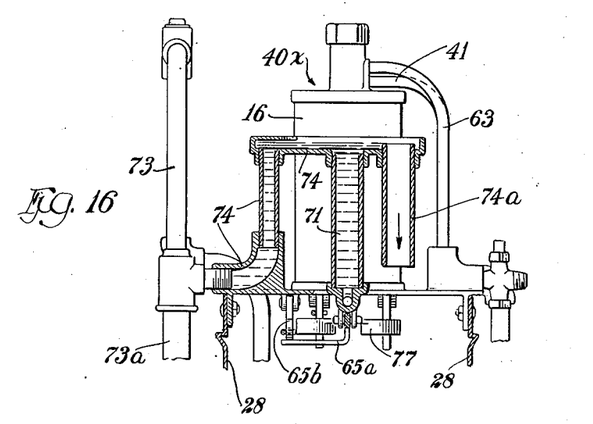
Fig. 16 is a vertical sectional detail showing the water connections leading to the controlling device for the fuel gas, being taken on the line 16—16 of Fig. 3.
Figure 17:
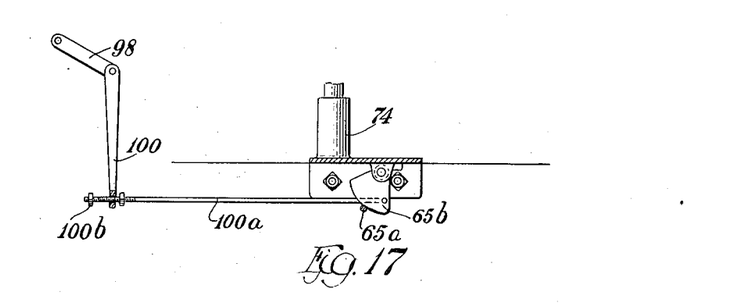
Fig. 17 is a detail of the same taken on a plane indicated by the line 17—17, of Fig. 9.

The fuel gas controlling valve 41$^x$ shown herein is substantially like that described in an application heretofore filed on January 11th, 1913, Serial Number 741,414, by Harrison H. Southworth and George A. Gase, and is illustrated in detail in Figs. 8 and 16.

62 indicates a casing into which a fuel gas supply pipe 63 (see Figs. 2, 4 and 8) opens. Said casing contains a float 64 fixed on a vertically movable stem 65 which has bearing in the top and bottom walls of the casing.

Figures 8, 10:
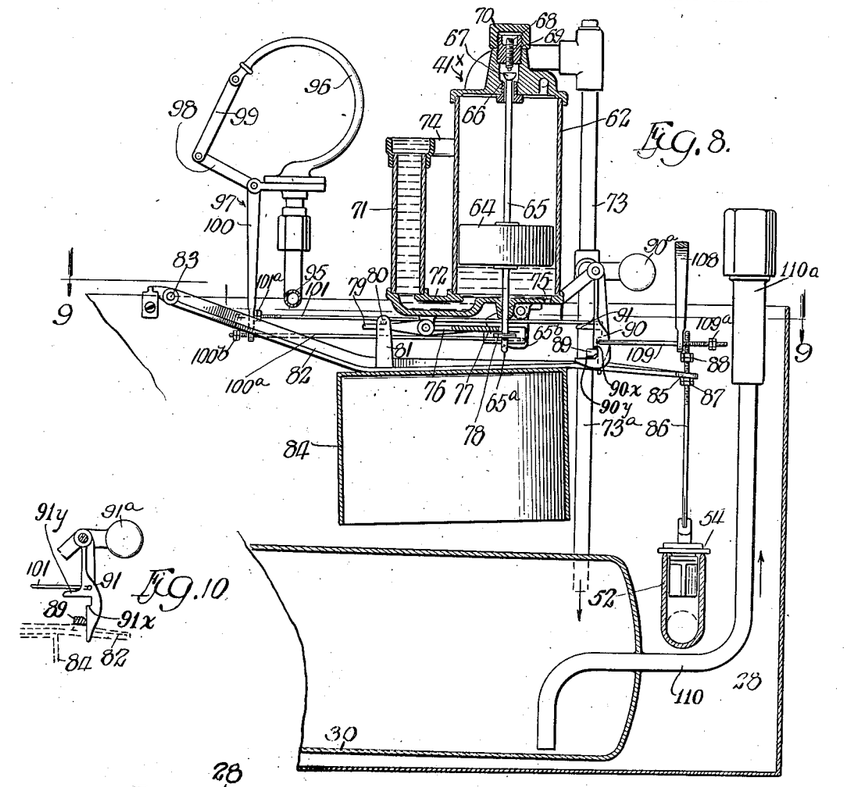
Fig. 8 is a detail sectional view on an enlarged scale, showing the mechanism for controlling the change of the alternate operations of my apparatus, taken in a plane indicated by the line 8—8 of Fig. 3.
Fig. 10 is a detail sectional view of a latch appearing in Figs. 8 and 9, the plane of the section being indicated by the line 10—10 of Fig. 9.
Figure 9:
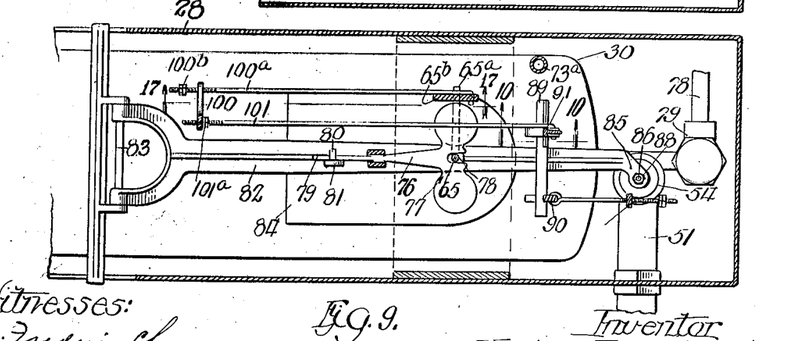
Fig. 9 is a detail plan sectional view of parts illustrated in Fig. 8, the plane of the section being indicated by the line 9—9 of Fig. 8.

66 indicates a ported valve seat in the top of the casing, through which the fuel gas from the supply pipe 63 enters the interior of said casing 62. A valve-plug 67 fixed to the top of the stem 65 and adapted to seat on said ported valve seat controls the supply of fuel gas to the casing.

68 indicates an adjusting pin in a plug 69 in the top of the casing located above the valve plug 67 to limit the movement of said valve plug from its seat. A cap 70 incloses said plug and pin to prevent it from being tampered with.

71 indicates a stand-pipe placed adjacent to the casing 62 and preferably connected therewith at the bottom by means of an integral conduit 72.

73 indicates a pipe for supplying cooling water to the apparatus. Said pipe has a branch connection $73^a$ for directing cooling water into the tank 28 and it is also connected by means of a horizontal trough-shaped fitting 74 to the top of the stand-pipe 71. The said fitting 74 is provided with an overflow pipe $74^a$ which directs the surplus of water from the pipe 73 into the tank 28. The bottom of the casing 62 is provided with a small opening 75 so that in case the supply of the water to the casing is discontinued all the water therein will drain out. Manifestly, as long as the stand-pipe is supplied with water the position of the float in the casing and the distance of the valve plug above its seat will depend upon the head of fuel gas as compared to the head of water in the stand-pipe.

76 indicates a vertically swinging lever fulcrumed to the bottom of the conduit 72 and having a weighted arm 77 which is adapted to engage and bear down upon a nut or pin 78 on the stem 65, which is prolonged downwardly below the bottom of the casing 62. Said lever 76 also has an arm 79 which is adapted to be engaged by a pin 80 on a lug 81 fixed to the top of a vertically swinging lever 82 that is fulcrumed to a rod 83 fixed transversely in the top of the tank 28.

84 indicates a float, which, as shown, is in the form of an inverted hollow cup and is attached to the lever 82. The lever 82 is projected beyond the float 84 and carries at its end an eye 85, through which depends a rod 86 attached to the valve plug 54 heretofore referred to, that controls the outlet for the water contained in the tank 28. Said eye 85 works between nuts 87, 88, screwed upon the rod 86.

89 indicates a transverse bar on the lever 82 intermediate the float 84 and the rod 86. Said bar is adapted to be engaged at one end by a pawl 90, and at the other end by a pawl 91. Said pawls are each provided with bell-crank weighted arms $90^a$, $91^a$, respectively, adapted to normally hold them in position to engage the said transverse bar 89.

The pawl 90 is actuated by means depending for its operation upon a predetermined temperature to be attained in the generator-absorber 25 when the same is generating, while the pawl 91 is actuated by means depending for its operation upon the reduction of pressure in the condenser 30 at the time all of the liquid refrigerant in said condenser has been exhausted. Said means are as follows: 95 indicates a pipe connected with the condenser and is shown as leading from a point in the pipe 32, that discharges into the condenser beyond the check-valves 36 and 37, the connection being such that the pressure in the pipe 95 is true condenser pressure. Said pipe 95 has connected to it a Bourdon spring tube 96, operated by the pressure in this line. 97 indicates a bell-crank-lever fulcrumed in the plane of the Bourdon tube and having an arm 98, which is connected by a link 99 with the end of said Bourdon tube. The other arm 100 of said lever is in preferably substantially vertical position and is adapted to engage a nut $101^a$ on a rod 101 connected to the catch or pawl 91. As will be readily understood, when the pressure in the condenser is high, the Bourdon tube will tend to straighten out, thus holding the vertical arm 100 of the lever away from the nut $101^a$, that is to say, to the left of said nut, as shown in the drawings. When the pressure in the condenser falls, the Bourdon tube will tend to contract, thus shifting the vertical arm 100 of the lever 97 toward said nut, that is to say, to the right. The lever when it strikes said nut will act to shift the pawl 91 to the right and thus disengage it from the bar 89.

Should the condenser pressure in the pipe 95 for any reason become excessive, said excessive pressure will act to shut off the fuel gas passing through the valve $41^x$, in the following manner: The valve stem 65 is provided below the nut 78 with a laterally extending arm $65^a$ which is engaged upon its upper side by a cam $65^b$. Said cam is substantially in the form of a quadrant and is pivotally supported from the bottom wall of the casing 62. $100^a$ indicates a rod pivotally connected at one end to the cam $65^b$ and at its opposite end projects through an aperture in the lower end of the arm 100 beyond which said rod $100^a$ is provided with nuts $100^b$. When the pressure in the pipe 95 is excessive said pressure will tend to straighten out the Bourdon tube 96 causing the arm 100 to swing to the left as viewed in Fig. 2, 8, 9 and 17, until said arm strikes against the nuts $100^b$ on the rod $100^a$, when said rod will then move in the same direction. This movement will cause the cam 65<sup>b</sup> to bear against the arm 65<sup>a</sup> of the movable valve stem 65 to move the same downwardly so as to bring the valve plug 67 toward its seat, thus either partially or entirely shutting off the supply of fuel gas to the interior of the casing 62. When the pressure in the pipe 95 has subsided the Bourdon tube will contract to its original shape, the arm 100 will move to the right allowing the cam 65<sup>b</sup> to assume its original position by gravity thus freeing the arm 65<sup>a</sup> from its control, the water in the casing 62 operating on the float 64 to raise the same, thus allowing fuel gas to again enter the casing 62.

Figure 11:
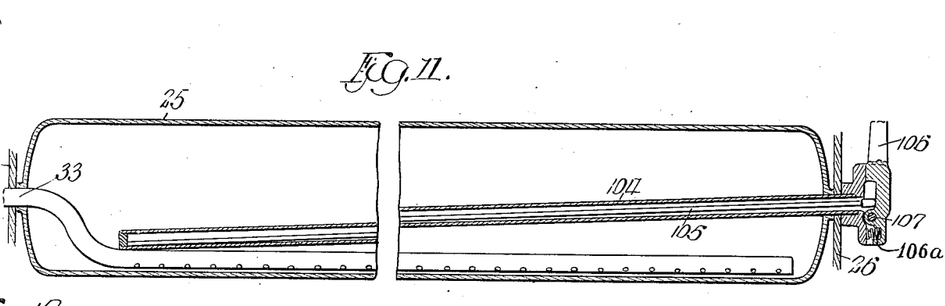
Fig. 11 is a longitudinal vertical sectional view of the generator-absorber, the plane of the section being indicated by the line 11—11 of Fig. 4.

In the generator-absorber 25 is located a tube 104 (see Fig. 11) containing a thermostatic rod 105 which projects beyond said generator-absorber drum and engages a spring controlled lever 106 fulcrumed at 107 adjacent the end of said drum. Said lever 106 has an arm 108 which projects upwardly above the top of the tank 28 and depends into said tank where it is arranged to engage a nut 109<sup>a</sup> on a rod 109 connected to the dog 90. The nut 109<sup>a</sup> on said rod is adapted to be engaged by said arm 108 when by the expansion of the thermostatic rod 105 said lever has been caused to move far enough, in which case said lever acts to swing the rod to the right, as viewed in the drawings, and disengage the pawl 90 from the transverse bar 89.

Figures 1, 14, 15:
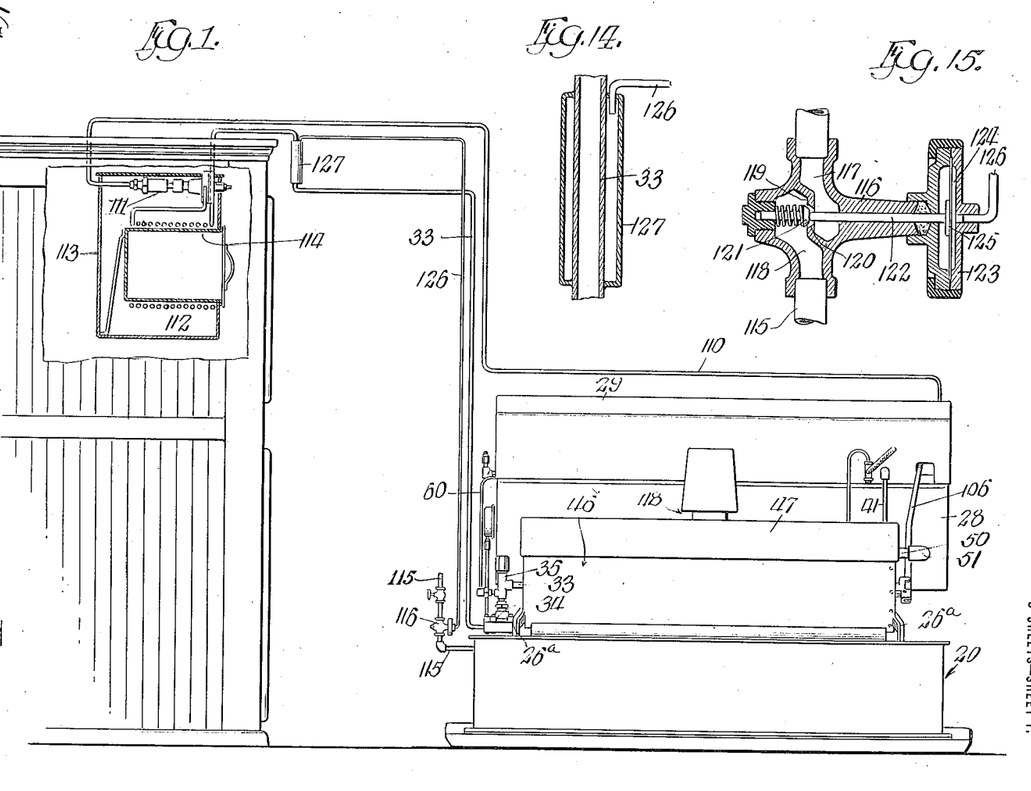
Figure 1 is a view in front elevation of an apparatus embodying my invention and also illustrating the manner in which said apparatus is connected with the expansion coils in the compartment or box to be refrigerated.
Fig. 14 is a vertical section of a temperature control device located in the conduit leading from the expansion coil to the generator-absorber.
Fig. 15 is a vertical section of a controlling valve mechanism interposed on the cooling water supply pipe.

The course of the anhydrous ammonia and the ammonia gas through the apparatus described, is as follows: The ammonia gas passes from the still when driven off through the pipes 31 and 32, check valves 36 and 37 to the condenser 30, and from the condenser through the pipe 110 heretofore mentioned, which leads from adjacent the bottom of the tank of the condenser drum 30 through a valve 110<sup>a</sup>, (which is preferably adapted to be manually closed when desired) to the expansion coils 112 in the brine tank. The brine tank is located in a suitable box or room to be refrigerated, such as indicated in Fig. 1, corresponding to the refrigerator proper. In passing to the coils in the brine tank, the anhydrous ammonia passes through a back pressure expansion valve 111 of the usual construction, which is adapted to shut off the flow through the coils when the expanding ammonia gas therein reaches a predetermined pressure. Accordingly, during generation the pressure of the ammonia gas left from the preceding absorption period in the return line between the expansion valve 111 and the absorber check valve holds the expansion valve closed, thus confining the liquid anhydrous ammonia between that valve and the check valve 37.

From the expansion coils the ammonia gas is led back to the generator-absorber, through the check valves 34 and 35, heretofore described, and into the liquid in the generator-absorber. The pipe 33 preferably extends along the bottom of the drum 25 and is provided with suitable openings so that the ammonia gas in tending to rise from these openings will necessarily pass through all of the liquid absorbent.

In Fig. 1 is shown a small metal box 113, set into the brine tank and having a suitable cover, in which various "ices" and the like, may be frozen.

Figure 2:
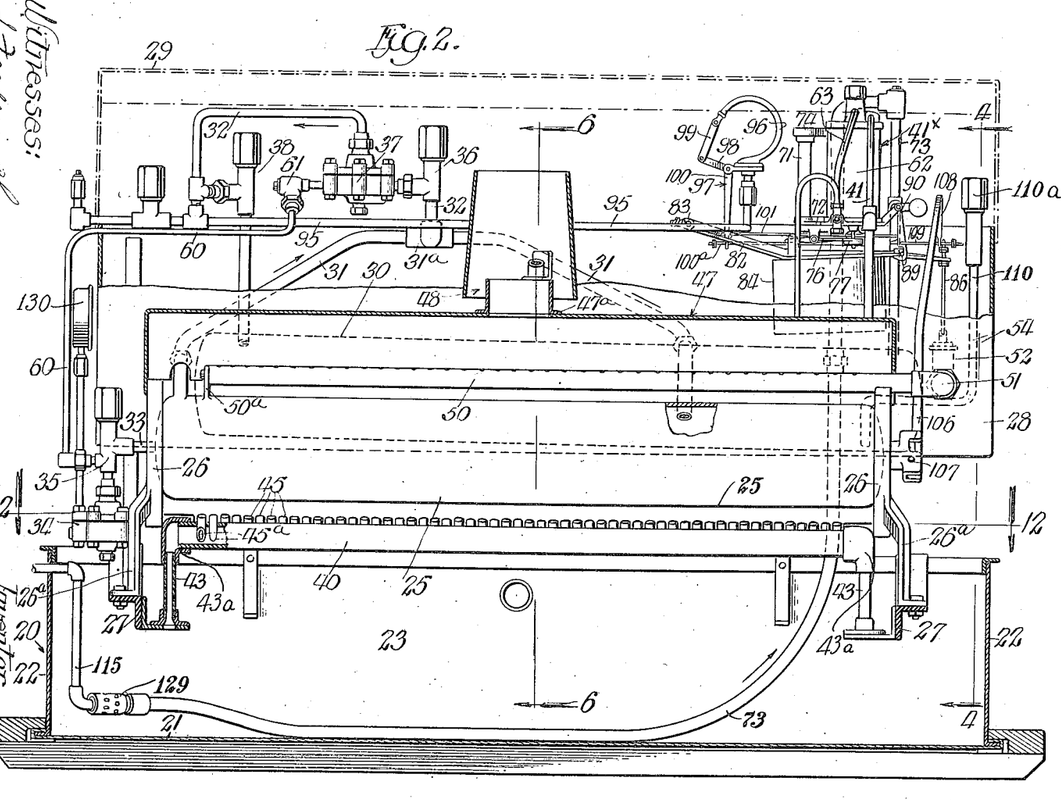
Fig. 2 is a view partly in front elevation and partly in vertical section on an enlarged scale, of the refrigerating apparatus.
Figure 3:
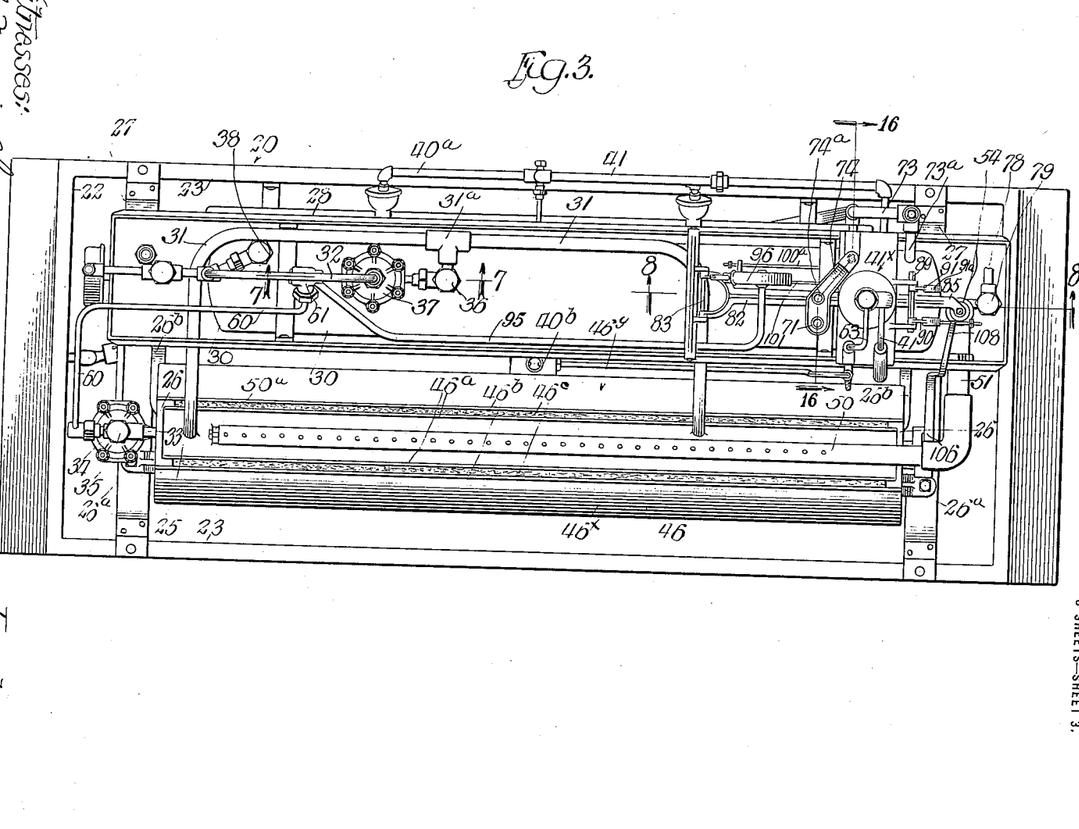
Fig. 3 is a top plan view of the same.

130, Figs. 2 and 5 is a pressure indicator connected with the return line 33, by which the efficiency of the refrigerating operation may be ascertained.

The operation of the apparatus thus far described, is as follows. Starting with the heating cycle, the water flowing into the stand pipe 71 by its action on the float 64 in the casing 62, acts to maintain the valve plug 67 raised from its seat so that there is a flow of gas through the pipe 41 to the burner pipe 40. During this period, the valve plug 54 is closed on its seat so as to prevent the escape of water from the tank to the water discharge pipe 50 and the water accumulating in the tank 28 has risen therein to its overflow level and tends to raise the cup-shaped float 84, and with it the lever 82. This rise of the float and lever, however, is prevented by means of a horizontal stop 90<sup>x</sup> on the pawl 90 which engages the bar 89 carried by the lever 82. As the heating process continues, the temperature in the still 25 gradually rises until a predetermined point is reached corresponding to the desired degree of de-saturation of the liquor in the still. As this temperature is approached, the thermostatic rod 105 expands and by reason of its engagement against the lever 106 gradually swings the depending arm 108 of said lever toward the nut 109<sup>a</sup> on the link 109 connected with the pawl 90. When said predetermined temperature is reached, the movement of the said lever is such as to longitudinally move the link 109 (to the right, as shown in Fig. 8), so as to withdraw the horizontal shoulder 90<sup>x</sup> on the pawl 90 from its engagement with the bar 89 on the lever 82. This releases the float 84, which, under the flotation action of the water in the tank 28, rises. The arm 79 of the lever 76, which, up to this point has been held down by the pin 80 on the lug 81 connected with the float, is released so that the weighted arm 77 of the lever 76 is allowed to fall, and by its operative engagement with the valve stem 65 depresses said valve stem and closes the valve plug 67 on its seat, notwithstanding the buoying action of the water in the chamber 62 on the float 64 tending to maintain said valve in open position. This cuts off the gas to the burner which is thus extinguished and the heating cycle of the still is terminated. As the float 84 is raised, the horizontal bar 89 is caught by a horizontal shoulder 91$^y$ on the pawl 91 which arrests the upward movement of said float, and at the same time, the weighted arm 91$^a$ of the pawl 91, causes said pawl to swing (to the left as shown in Figs. 8 and 10) so as to engage a shoulder 91$^x$ on said pawl spaced vertically below the shoulder 91$^y$ under said bar 89. The pawl 91 thus supports this float and prevents it from falling when, as will presently appear, the water level in the tank 28 falls so as no longer to have any buoying action on the float. With the rise of the float 84, the eye 85 on the lever 82 engages the nut 88 on the link 87 which carries the water valve plug 54 and lifts said water valve plug so as to permit the escape of water from the tank 28 through the pipe 51 to the water discharge pipe 50 above the still 25. This produces an immediate rush of water into the pipe 50 owing to the large amount of water in the tank 28 above the level of said pipe, thus producing at the beginning of the cooling cycle a very large discharge of water on the hot still. This is of great advantage in that it results in the comparatively quick cooling of the still so as to shorten the period of time intermediate the point where actual generation ceases and absorption begins. When the generator absorber has begun to absorb the check valve 34 opens and the gas pressure in the return line is reduced by the absorption, and this causes the expansion valve to automatically open, whereupon the period of refrigeration begins.

As the still cools down, the thermostatic rod 105 shortens and withdraws from its engagement with the lever 106, which, under the action of its spring 106$^a$, swings to the left, as shown in Fig. 2 so as to withdraw its arm 108 from engagement with the nut 109$^a$ on the link 109 that is connected with the pawl 90. The pawl 90 being thus released, its weighted arm 90$^a$ swings it (to the left as shown in Fig. 8) so as to bring a horizontal shoulder 90$^y$ on said pawl (said horizontal shoulder being vertically spaced below the heretofore mentioned shoulder 90$^x$ on said pawl) into a position directly below the bar 89. Said shoulder 90$^x$ is thus in position to catch and support the float when, as will presently appear, the float is released by the other pawl 91. After the water in the tank 28 has fallen to the level of the valve seat of the valve plug 54, the still cooling water pipe 50 continues to be supplied with water which overflows from the stand pipe 71. The cycle of absorption in the still 25 continues as long as cooling water is supplied to the stand pipe 71, and the refrigerant is absorbed in the still 25 in a familiar manner. The absorption cycle continues until all of the liquid ammonia in the condenser 30 and in the connections leading to the coils up to the valve 111, has been exhausted. As soon as this occurs, the pressure in the condenser and in the pipe 95 connected therewith, immediately drops and the Bourdon spring 96 will flex and swing the arm 100 of the bell crank lever 97 connected to said spring to the right (see Fig. 8) and engage the nut 101$^a$ on the link 101 that is connected with the pawl 91. This moves the link 101 and swings the pawl 91 from its supporting engagement with the bar 89 connected to the float 84, thus releasing said float. The float thereupon drops by gravity and with it, the pin 80 on the lug 81, said pin engaging the arm 79 of the lever 76 and raising the weighted arm 77 of said lever from its engagement with the valve stem, 65, which, up to this time this lever has been holding depressed. This permits the water flowing into the stand pipe 71 and into the casing 62 to again buoy up the float 64 and open the valve plug 67 so as to permit a flow of fuel gas into the casing 62, through the pipe 41 and the burner pipe 40. The gas escaping from said burner pipe is thereupon ignited by the pilot light in a familiar manner, and the period of generation begins again. When the float 84 descends, the eye 85 on the lever 82, engages the nut 87 on the link 86 connected with the water valve plug 54 and closes said plug on its seat, thus cutting off the supply of cooling water to the cooling water pipe 50, prior to the ignition of the gas in the burner pipe. When the dropping of the float 84 is arrested by the bar 89 engaging with the horizontal shoulder 90$^y$ on the pawl 90, the weighted arm 90$^a$ of said pawl acts to swing said pawl (to the left, as shown in Fig. 8), so as to engage the horizontal shoulder 90$^x$ above the bar 89. The parts are now in the position first described and the process of generation continues as before.

In order to control the temperature in the box in which the expansion coil is located, I provide a device for stopping the operation of the refrigerating apparatus whenever a predetermined low temperature is reached. This device forms the subject matter of my divisional application No. 31,111, filed May 29, 1915. It may be constructed as follows: 115 (see Figs. 1 and 15) indicates a main water supply pipe which supplies water to the stand pipe 71. 116 indicates a valve casing interposed in said pipe, said valve casing containing passages 117—118, which are connected by a ported valve seat 120. 121 indicates a spring controlled normally closed valve of any familiar construction, which is adapted to close the connection between said two passages. 122 indicates a longitudinally movable rod placed in line with the valve 121 and suitably supported in the casing 116. 123 indicates a diaphragm casing attached to the valve casing 116, and containing a diaphragm 125 so placed as to operatively engage the rod 122 on one side. The other side of said diaphragm casing is connected by a small pipe 126 with a tube 127, which is sealed about the return pipe 33 that leads to the generator-absorber. Said tube and pipe contain a fluid of low boiling point and having a high coefficient of expansion and contraction, as for example, sulphur dioxid ($SO_2$). This gas has the advantage of comparatively low pressure within the range of temperatures at which the apparatus operates. The diaphragm 125 is thus exposed on the side opposite to the rod 122 to the pressure of said fluid.

The fluid (sulfur dioxid gas) in the tube 127 is exposed to the temperature of the ammonia gas passing through the return pipe 33. As long as the ammonia gas, as it escapes from the outlet end of the refrigerating coil, has been so vaporized and expanded that it is incapable of materially affecting the temperature of the fluid in the tube 126, said fluid being expanded by the temperature of the atmosphere acts on the diaphragm 125 to maintain the valve 121 in open position. This allows the water to flow freely through the pipe 115 and this valve. As the box containing the expansion coil, however, is cooled and the refrigerant ammonia, passing through the expansion coil has less and less work to do, the ammonia refrigerant when it reaches the point in the return pipe 33 at which the tube 127 is located, will still be capable of further vaporization, and therefore, will take up heat from the fluid contained in said tube 127. This condition will be indicated externally by the fact that the frost line will advance on the pipe 33 to and beyond the tube 127. The cooling of the fluid contained in the tube 127 and in the pipe 126 will cause it to contract with a result that the diaphragm 125, no longer receiving sufficient pressure from said fluid to overcome the normal closing action of the valve 121, will allow the valve to close and cut off the water supply in the pipe 115. Thus the supply of water to the stand pipe 71 will fail and the cooling water which normally flows therefrom into the tank 28, and thence into the water pipe 50 above the still 25, will cease. As the still 25 is no longer cooled by the cooling water and as the refrigerant which still continues to flow to it continues to be absorbed, thus developing heat therein, back pressure in said still and in the return pipe will gradually increase until it reaches a point such that no more refrigerant is capable of passing through the back pressure expansion valve 111. This greatly decreases the refrigerating operation in the coils and allows the atmosphere to warm the tube 127 which lowers the pressure on the diaphragm and valve 116, opening this valve, allowing the cooling water to be supplied to the still, thus lowering the temperature and pressure, and the process of absorption is again resumed.

The pipe 115 is provided with an injector 129, in the tank 20, having openings through which water from the tank may be carried with the fresh supply into the pipe 73, allowing some of the water in the tank 20 to be used over and over again.

From the foregoing description it will be seen that I have provided a refrigerating apparatus in which the supply of gas is controlled automatically and the generator changed to an absorber and vice versa, by mechanism which is simple in construction and not liable to get out of order. It will be noted that I have provided an efficient means for preventing the wasting of the gas, depending for its operation on the conditions in the portion of the apparatus being heated by the gas. It will also be noted that I have provided mechanism for controlling the supply of liquid ammonia to the refrigerating coils whereby the supply of refrigerant is cut off except when the temperature is such as to require the supplying of the liquid ammonia to maintain the temperature desired. This greatly prolongs the period of absorption, which causes the heating operation to be much less frequent, thereby procuring the most economical use of the gas by the use of the frost line control above described in my apparatus. The cooling water is also most economically utilized.

It should be noted that a number of features shown in the drawings hereof and explained in the above description for clearness of understanding, are not claimed in this application, but in other copending applications. For example: the control of the termination of the absorption period by the exhaustion of the liquid anhydrous ammonia from the container therefor is claimed in my application No. 732,807, filed November 22nd, 1912; the gas burner shown is claimed in an application of mine filed contemporaneously herewith; the particular gas regulator shown is claimed in the application hereinbefore mentioned filed by myself and George A. Gase, and the check valve shown in Fig. 7 hereof is claimed in the application hereinbefore mentioned filed by George A. Gase.

Having thus described my invention, what I claim is:

1. In a refrigerating apparatus of the absorption type, the combination with generating and absorbing means, of a condenser, a tank containing the condenser and adapted to hold cooling water about it and above it, means for supplying heat for generation, and automatic means for shutting off the heat and dousing the absorber by the accumulated head of water in said tank above the condenser.

2. In a refrigerating apparatus of the character described, the combination of a generator-absorber, heating means therefor including a gas supply pipe and a water controlled valve in said pipe adapted to shut off the gas when the flow of water is stopped, means for supplying water to said valve continuously, a tank adapted to receive the water flowing from the valve, means for discharging the accumulated head of water in said tank over the generator-absorber, and means for simultaneously shutting off the gas.

3. In a refrigerating apparatus of the character described, the combination of a generator-absorber, a condenser, a tank surrounding said condenser, a gas burner for heating said generator, means for supplying cooling water to said condenser, an automatic gas regulator valve controlled by said water supply adapted to shut off the gas to the burner when the water is stopped, means for discharging the accumulated head of water in the condenser tank over the generator and discontinuing heating of the generator, means in the generator controlling said last named means, expansion coils, and means controlled by the condition in the expansion coils for regulating the supply of water.

4. In a refrigerating apparatus of the absorption type, the combination of a generator-absorber, a gas burner for heating the generator, a valve controlling the supply of gas to said burner adapted to be held open by flowing water, a condenser cooled by the water overflowing from said valve, and means controlled by a pressure device for closing said valve when the pressure in the condenser rises above a predetermined point.

5. In a refrigerating apparatus of the intermittent absorption type, the combination with a generator-absorber and a liquid refrigerant container, of a means for alternately heating and cooling the generator-absorber, a tank for holding cooling medium, means for controlling the reversal of such operations dependent for its operation on the condition within the generator and on the exhaustion of the liquid refrigerant in said container, and a float device outside of the container and within said tank furnishing the power for reversing the operations.

6. In a refrigerating apparatus of the intermittent absorption type, the combination of a still, a liquid refrigerant container, means for alternately heating and cooling the still, mechanism for causing the reversal of such operations, a float furnishing the power for operating the reversal mechanism, a tank around the liquid container for cooling water, said float being operated by the varying height of such water, means for controlling the operation of such float being dependent on the temperature within the still for one reversal and on the complete exhaustion of the liquid refrigerant in the container for the other reversal.

7. In a refrigerating apparatus of the intermittent absorption type, the combination of a still and a liquid refrigerant container, of means for alternately heating and cooling the still, a tank adapted to contain cooling water, mechanism for stopping the flow of gas and discharging water from the tank over the still to reverse the cycle and operating to shut off the water to the still and permit the flow of gas to be resumed, and a float in the tank acting by buoyancy to operate said mechanism for one reversal of the cycle and by its weight for the other reversal of the cycle.

8. In a refrigerating apparatus of an intermittent absorption type, the combination of a still and a liquid refrigerant container, of means for alternately heating and cooling the still, a tank surrounding the refrigerant container, a gas valve controlling the heating and adapted to be regulated by the flow of water, said water overflowing into said tank, mechanism for stopping the flow of gas and discharging the water in said tank over the still to reverse the cycle and operating to permit the flow of gas to be resumed and said tank to refill, and a float in said tank acting by buoyancy to operate said mechanism for one reversal of the cycle and by its weight for the other reversal of the cycle.

9. In a refrigerating apparatus of an intermittent absorption type, the combination of a still and a liquid refrigerant container, a gas burner for heating the still, a valve controlling the supply of gas to said burner adapted to be regulated by a flow of water, a tank around said container adapted to receive water flowing from said valve, a float adapted in one position to hold said valve open, means for latching it in said position holding it against its buoyancy, means dependent upon the condition in the still for tripping said latch allowing the float to rise and cut off the supply of gas, a latch for holding the float in its upper position thereby holding said valve closed, and a pressure device connected with the liquid container adapted to trip said last named latch when the pressure in the container falls by reason of the complete exhaustion of the liquid refrigerant.

10. In a refrigerating apparatus of the absorption type, the combination of a generator-absorber, a burner for heating said generator-absorber, a water discharge pipe for cooling said generator-absorber, a water controlled gas regulator valve for supplying said burner, means for supplying water to said regulator valve, a tank to receive the overflow water from said regulator valve and connected to said water discharge pipe, a water discharge valve controlling the flow of water from said tank to said water discharge pipe, a float in said tank, means operatively connecting said water discharge valve with said float, means for locking said float against movement during the generating cycle of said generator-absorber, and means for releasing said float to raise said discharge valve at the end of said generating cycle.

11. In a refrigerating apparatus of the absorption type, the combination of a still acting in cycles as a generator and absorber, a condenser for the refrigerant driven off from the still, means for cooling said condenser comprising a tank adapted to fill during the generative cycle, and means discharging accumulated water in said tank over the still during the first portion of the absorption cycle.

12. In a refrigerating apparatus of the absorption type, the combination of a still acting in alternate cycles as a generator and as an absorber, a tank constructed to overflow at a certain level, means supplying water to said tank, a valve adapted to discharge all the contents of said tank above a certain lower lever, a device for discharging cooling water from said tank upon said still, said valve controlling the supply of water from said tank to said still, means for opening said valve at the beginning of the absorption cycle of said still, and means for closing said valve at the end of the absorption cycle.

13. In a refrigerating apparatus of the absorption type, the combination of a still acting as a generator and as an absorber in alternate cycles, a cooling water tank, a condenser in said tank, means for supplying cooling water to said tank, a valve for discharging cooling water from said tank upon said still, and a water-power device actuated by the water in said tank for opening said valve at the beginning of the absorption cycle of said still.

14. In a refrigerating apparatus of the absorption type, the combination of a still acting as a generator and as an absorber in alternate cycles, a cooling water tank, a condenser in said tank, means for supplying cooling water to said tank, a valve for discharging cooling water from said tank upon said still, a water-power device actuated by the water in said tank for opening said valve at the beginning of the absorption cycle of said still, means for reversing the cycle dependent respectively on the conditions in the still and the exhaustion of the refrigerant from the condenser, and means for closing said last named valve at the end of the absorption cycle.

15. In a refrigerating apparatus of an intermittent absorption type, the combination of a still and a liquid refrigerant container, a gas burner for heating the still, a valve controlling the supply of gas to said burner, a tank around said container adapted to receive water, a float adapted in one position to hold said valve open, means for latching it in said position holding it against its buoyancy, and means dependent upon the condition in the still for tripping said latch allowing the float to rise and cut off the supply of gas.

16. In a refrigerating apparatus of the absorption type, means for supplying cooling water as required in the operation of said apparatus, a valve controlling a flow of fuel gas for the production of heat required in the operation of said apparatus, and means acting to automatically close said fuel gas valve upon the failure of the supply of cooling water to said apparatus, said means comprising a water chamber with a draining opening and a movable member in said chamber connected with the gas valve.

17. In a refrigerating apparatus of the absorption type, means for supplying a liquid cooling agent as required in the operation of said apparatus, means for supplying a heating agent as required in the operation of said apparatus, means acting to automatically cut off the supply of the heating agent upon the failure of the supply of cooling agent to said apparatus and for automatically turning on the supply of the heating agent after the supply of the cooling agent has been restored, said automatic means comprising a chamber adapted to be supplied with liquid and having a movable member in the chamber, and a device connected with the movable member and controlling the supply of heating agent.

18. In a refrigerating apparatus of the absorption type, means for supplying cooling water as required in the operation of said apparatus, a valve controlling the flow of fuel gas for the production of heat required in the operation of the apparatus, and means acting to automatically close said fuel gas valve upon the failure of the supply of cooling water to said apparatus, said last named means maintaining said fuel gas valve in closed position until after the supply of cooling water has been again started.

19. In a refrigerating apparatus of the absorption type, the combination with generating and absorbing means, of a gas burner for supplying heat for generation, a valve controlling the supply of gas to said burner, a condenser, a pressure responsive device in communication with the condenser, and means operated thereby for closing said valve when the pressure in the condenser rises above a predetermined point.

20. In a refrigerating apparatus of the absorption type, the combination with generating and absorbing means, of means for effecting the reversal from one to the other including a movable device adapted to act both as a weight and as a float, means for latching said device down at one time to prevent it floating, and means for latching it up at another time to prevent it dropping.

21. In a refrigerating apparatus of the absorption type, the combination with generating and absorbing means, of means for effecting the reversal from one to the other including a movable device adapted to act both as a weight and as a float, means for latching said device down at one time to prevent it floating, means for latching it up at another time to prevent it dropping, and thermostatic means connecting with the generator for releasing said device when it is latched down.

22. In a refrigerating apparatus of the absorption type, the combination with generating and absorbing means, of means for effecting the reversal from one to the other including a movable device adapted to act both as a weight and as a float, means for latching said device down at one time to prevent it floating, and means for latching it up at another time to prevent it dropping, and a pressure responsive device connected with the condenser for releasing said device when it is latched up.

23. In a refrigerating apparatus of the absorption type, the combination with generating and absorbing means, of means for effecting the reversal from one to the other including a movable device adapted to act both as a weight and as a float, means for latching said device down at one time to prevent it floating, means for latching it up at another time to prevent it dropping, means actuated consequent upon a predetermined degree of weakness of solution being reached in the generator for releasing said device when latched down, and means actuated by exhaustion of liquid anhydrous refrigerant in the condenser for releasing said device when latched up.

24. In a refrigerating apparatus of the absorption type, the combination with generating and absorbing means, of a movable device adapted to act both as a weight and as a float, means for effecting one reversal in the refrigerating cycle by the gravity of said device and the other by its buoyancy, and controlling means for said movable device.

25. In a refrigerating apparatus of the absorption type, the combination of a movable device adapted to act both as a weight and a float, a tank containing said device and adapted to hold water raising the float and release said water allowing the weight to drop, and means for terminating the generating period consequent upon the rising of said float, and means for terminating the absorption period consequent upon the dropping of said weight.

26. In a refrigerating apparatus, the combination with suitable vessels, of means for supplying gas, means for supplying cooling water, a device adapted to act interchangeably as a weight or as a float, and means for turning off the gas and turning on cooling water when the float rises, and means for turning on the gas and shutting off the water when the weight drops.

27. In a refrigerating apparatus, the combination with suitable vessels, of means for supplying gas, means for supplying cooling water, a device adapted to act interchangeably as a weight or as a float, means for turning off the gas and turning on cooling water when the float rises, means for turning on the gas and shutting off the water when the weight drops, and a thermostat in the generator for releasing the float to allow it to rise, and a pressure device connected with the condenser for releasing the weight allowing it to drop.

28. In a refrigerating apparatus, the combination of a tank adapted to contain liquid, a movable device adapted to act interchangeably as a float and as a weight rising by buoyancy or dropping by gravity according to the height of the liquid in the tank, means for automatically latching said device in its upper position following by a falling of the liquid, and means for automatically latching it in its lower position followed by a rising of the liquid, and means for effecting the reversals in the refrigerating cycle consequent upon the movement of said device.

29. In a refrigerating apparatus, the combination of a tank adapted to contain liquid, a movable device in said tank adapted to act interchangeably as a float and as a weight, means whereby the rising of said device releases liquid from the tank, means whereby the falling of said device causes liquid to rise in the tank, means for automatically releasing the device when in its lower position and latching it in its upper position before the liquid has time to materially lower in the tank, means for automatically releasing it from its upper position and latching it in its lower position before the liquid has time to materially rise in the tank, and means for effecting the reversals of the refrigerating cycle consequent upon the movement of said device.

30. In a refrigerating apparatus, the combination of a tank adapted to contain liquid, a movable device in said tank adapted to act interchangeably as a float and as a weight, means whereby the falling of said device causes liquid to rise in the tank, and means for automatically releasing it from its upper position and latching it in its lower position before the liquid has time to materially rise in the tank, and means for effecting a reversal of the refrigerating cycle consequent upon the movement of said device.

31. In a refrigerating apparatus, the combination with generating and absorbing means of a tank adapted to contain liquid, a movable device adapted to act interchangeably as a float and as a weight rising by buoyancy or dropping by gravity according to the height of the liquid in the tank, means for automatically latching said device in its upper position followed by a falling of the liquid, and means for effecting a reversal in the cycle of generating and absorbing operations consequent upon the movement of said device.

32. In a refrigerating apparatus, the combination with generating and absorbing means of a tank adapted to contain liquid, a movable device in said tank adapted to act interchangeably as a float and as a weight, means whereby the rising of said device releases liquid from the tank, means for automatically releasing the device when in its lower position and latching it in its upper position before the liquid has time to materially lower in the tank, and means for effecting a reversal in the refrigerating cycle consequent upon the movement of said device.

33. In a refrigerating apparatus, the combination with generating and absorbing means of a tank adapted to contain liquid, a movable device adapted to act interchangeably as a float and as a weight rising by buoyancy or dropping by gravity according to the height of the liquid in the tank, means for automatically latching said device in its lower position followed by a rising of the liquid, and means for effecting a reversal in the refrigerating cycle consequent upon the movement of said device.

34. In an absorption refrigeration apparatus, the combination with a receptacle for liquid refrigerant and an absorber, of means for supplying a cooling medium to the absorber, a float-and-weight device for terminating the absorption period adapted to be raised by water power, means for controlling the supply of water to such device to raise it, and controlling means for releasing it when raised, said controlling means being operated by the pressure conditions in said receptacle.

35. In a refrigeration apparatus of the absorption type, the combination with generating and absorbing means and a receptacle for liquid refrigerant, of means for supplying heat for generation, and means actuated by an excess of pressure in said receptacle for reducing the heat supplied.

In testimony whereof, I hereunto affix my signature in the presence of two witnesses.

HARRISON H. SOUTHWORTH.

Witnesses:
 THOS. H. WELLS,
 JUSTIN W. MACKLIN.